United States Patent [19]
Long et al.

[11] Patent Number: 5,494,478
[45] Date of Patent: Feb. 27, 1996

[54] TOOLLESS QUICK CHANGE BLADE HOLDER APPARATUS

[76] Inventors: John W. Long, 12203 Nicholas St., Omaha, Nebr. 68154; David L. Thiede, 14825 N. 72nd St., Omaha, Nebr. 68122

[21] Appl. No.: 387,580

[22] Filed: Feb. 13, 1995

[51] Int. Cl.$^6$ .................................................. A22B 5/16
[52] U.S. Cl. ............................................................ 452/127
[58] Field of Search ................................. 452/127, 129, 452/133, 135

[56] References Cited

U.S. PATENT DOCUMENTS

| | | | |
|---|---|---|---|
| 3,610,203 | 10/1971 | Müller | 118/100 |
| 3,699,830 | 10/1972 | Pickett | 83/13 |
| 3,892,010 | 7/1975 | Bartels et al. | 452/127 |
| 5,211,097 | 5/1993 | Grasselli | 83/698 |
| 5,288,264 | 2/1994 | Braeger | 452/127 |

*Primary Examiner*—Willis Little
*Attorney, Agent, or Firm*—John A. Beehner

[57] ABSTRACT

The present invention discloses a toolless quick change blade holder for receiving and supporting a blade in a skinning machine for trimming a layer of unwanted material from a meat product. The disclosed blade holder is equally well adapted for both automatic and manual machines. The blade holder comprises a lower base plate and an upper clamping plate adapted to be removably secured to the lower base plate. The blade is positioned between the forward portions of the lower and upper plates. A fulcrum device is included for removably securing the upper plate to the lower plate and for limiting upward movement of the central portion of the clamping plate relative to the base plate. A device for releasably separating the rearward portions of the upper and lower plates activates the fulcrum device causing pressure to be applied on the forward portions of the plates urging them together thereby creating a clamping action on the blade, retaining it in position. The device for releasably separating the rearward portions of the plates may include a ramp, the scaling of which results in the separation of the plates.

6 Claims, 12 Drawing Sheets

TOOLLESS QUICK CHANGE BLADE HOLDER APPARATUS

BACKGROUND OF THE INVENTION

1. Technical Field

The apparatus of this invention relates generally to an apparatus for replacing a trimming blade in a skinning machine. More specifically, it relates to an apparatus wherein the blade may be easily and quickly removed from its holder without the need for tools or for removing the holder from the machine thereby minimizing the contact the operator must have with the holder. The design of the present invention is especially well suited for use in automatic skinning machines where access to the blade holder may be limited.

Meat "muscles" or "products" as used herein will refer broadly to beef, pork, poultry, fish and the like. Materials to be trimmed may be fat, membranes, skin, connective tissue, gristle, bone, or the like. Machines for accomplishing such tasks are referred to in the art as skinning, trimming, or de-rinding machines.

The majority of blade holders utilized on automatic skinning machines comprise a lower base position and an upper clamping portion with the blade "sandwiched" in between. The base and clamping portions are held together using a series of screws which, when tightened, clamp the plates together, exerting pressure on the blade therebetween, keeping it in proper position. Currently, most automatic trimming machines utilize a blade holder wherein replacement of the blade requires that holder be removed from the machine. After removal from the machine, the screws are loosened, the blade replaced, and the holder reinstalled in the machine.

The blades used in the meat trimming industry are generally of stainless steel construction and are extremely sharp. The extreme sharpness of the blade poses a very serious safety hazard to those who operate or are otherwise exposed to the machines. The holders used to position and hold the blades in place in the machine are quite heavy and cumbersome, especially when the holder must be removed from the machine. The weight and cumbersome nature of the holder increase the likelihood that a person changing the blade could lose his grip on the holder. Since the blade is exposed wherein the installed holder, this can have disastrous consequences. On at least one occasion, a person was severely injured when he lost his grip on the holder and it fell onto his leg. Therefore, it is very desirable to limit the exposure people have with the blade and holder. The present invention provides a means for limiting exposure to the blade and holder by eliminating the need for removing the holder from the machine to change the blade.

The present invention is adapted to be used on a variety of trimming machines and is especially well suited for use on automatic meat trimmers of the type described generally in U.S. Pat. No. 5,236,323 which is herein incorporated by reference, or any of a wide variety of automatic trimming machines. Specific examples of such machines are the Maja GEA, SBA, UBS, SRA, EUM, ESM, TEM and ESB series machines. However, the invention's use is not limited to these machines but rather is suitable for all manual or automatic machines.

2. Description of the Prior Art

Prior art devices for holding and retaining trimming blades are well known in the art as described above. However, the majority of blade holders utilized on automatic skinning machines comprise a lower base position and an upper clamping portion with the blade "sandwiched" in between. The base and clamping portions are held together using a series of screws which, when tightened, exert pressure on the blade therebetween, keeping it in proper position. Currently, most automatic trimming machines utilize a blade holder similar to a Maja P/n 06-000 blade holder wherein replacement of the blade requires that holder be removed from the machine. The holder comprises a lower base portion and an upper clamping portion. A series of screws holds the two plates together with the blade sandwiched therebetween. After removal from the machine, the screws are loosened, the blade replaced, and the holder reinstalled in the machine. As mentioned above, this handling of the holder has the potential for serious injury.

There have been developed, blade holders for use on manual trimming machines, which permit the removal and replacement of trimming blades without removal of the holder from the machine. However, as mentioned, these holders are generally unsuitable for use in automatic machines or suffer other drawbacks. One such example of a blade holder for use on a manual machine is provided in Grasselli, U.S. Pat. No. 5,211,097.

Grasselli discloses a blade holder wherein a cylindrical cam extending along the width of the holder and having a lengthwise flat surface, is used as the release mechanism. A lever bar is connected to the ends of the cylindrical cam for rotating the cam about its axis and controlling the positioning of the cam flat surface. This lever bar used to position the cam renders the Grasselli's blade holder unsuitable for use in an automatic skinning machine since the lever bar would interfere with its installation and operation in an automatic machine.

Consequently, there is a great need for an blade holder apparatus which is capable of allowing the replacement of the trimming blade without the need for tools or for handling the blade holder.

Therefore, a primary objective of the present invention is to provide a blade holder apparatus which permits the removal and replacement of the trimming bade without the need of tools.

Another object of the present invention is to provide an blade holder apparatus and method wherein the trimming blade may be replaced without the need for removing the holder from the trimming machine.

Another object of the present invention is to provide a blade holder which is capable of being utilized on automatic trimming machines.

Another object is to provide an apparatus which can accommodate a variety of blade types.

Another objective is to provide a blade holder of a design wherein the contact of the meat with the blade serves to further clamp the blade into position.

Another objective is to provide a blade holder in which the mechanism providing the locking action is also able to facilitate disengagement of the apparatus.

Another objective is to provide a blade holder apparatus having a means for adjusting the depth of the blade in the holder and consequently the amount of material which is trimmed from the meat product.

Finally, an object of the present invention is to provide a blade holder apparatus which is constructed with a minimum number of components and is of rugged durable construction to withstand the harsh environments encountered in the meat trimming industry.

SUMMARY OF THE INVENTION

The present invention discloses a toolless quick change blade holder for receiving and supporting a blade in a skinning machine for trimming a layer of unwanted material from a meat product. The disclosed blade holder is equally well adapted for both automatic and manual machines. The blade holder comprises a lower base plate and an upper clamping plate adapted to be removably secured thereto. The blade is positioned between the forward portions of the lower and upper plates. A fulcrum means is included for removably securing the upper plate to the lower plate and for limiting upward movement of the central portion of the clamping plate relative to the base plate. A means for releasably separating the rearward portions of the upper and lower plates activates the fulcrum means causing pressure to be applied on the forward portions of the plates urging them together thereby creating a clamping action on the blade, retaining it in position. The means for releasably separating the rearward portions of the plates may include a ramp, the scaling of which results in the separation of the plates.

DESCRIPTION OF THE PREFERRED EMBODIMENT

One of the objectives of the invention is to provide a quick change blade holder which is adapted to fit on conventional skinning machines both manual and automatic machines such as the MAJA GEA, SBA, ESB, UBA, SRA, EUM, ESM, TEM and the like.

Figure 9:
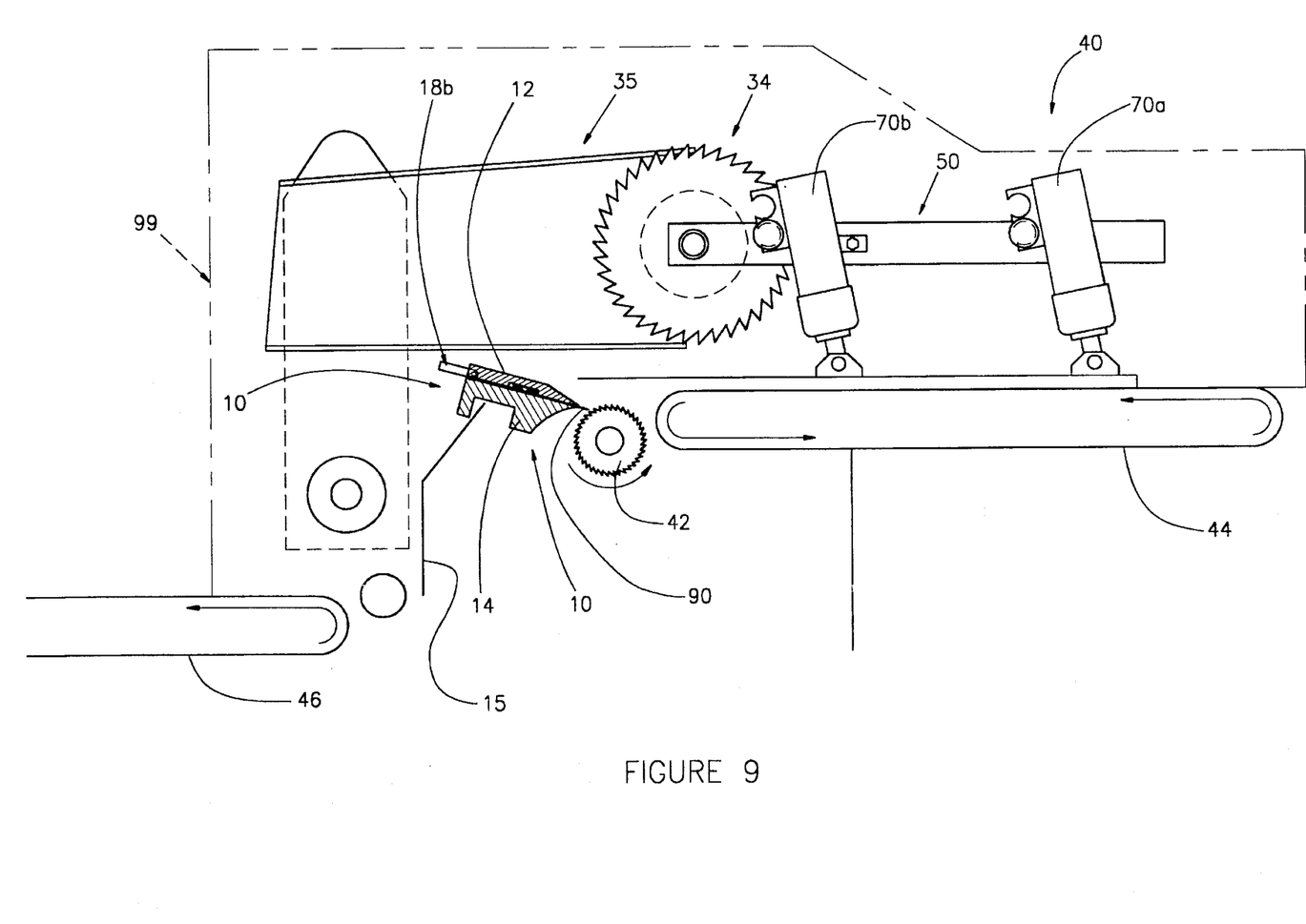
FIG. 9 is a side view of the bent blade holder installed on an automatic skinning machine.

FIG. 9 is a side view illustrating the toolless quick change blade holder apparatus of the present invention installed on one example of a conventional automatic skinning machine. As mentioned above, the quick change blade holder of the present invention is especially adapted to work on automatic skinning machines.

The trimming operation of the quick change blade holder in conjunction with an automatic skinning machine is shown in FIG. 9. The meat product is transported by the feed conveyor 44 to press rollers 34 and into trimming engagement with the blade 90. Typically, blade 90 is a stainless steel blade. Press roller 34 is located above and slightly forward of the blade 90. When the meat product is brought into contact with the press roller 34 the teeth of the press roller engage the meat product, and in cooperation with feed conveyor 44, move it rearward, bringing it into trimming engagement with trimming blade 90. The machine would also comprise a safety enclosure 99 adapted to enclose the machine. As is well understood in the art, the enclosure 99 would be connected to a stop switch such that the machined will not function unless the enclosure 99 is in the closed position. This is but one of the many automatic skinning machine configurations on which the present quick change blade holder is adapted to work.

It will be observed from FIG. 9 that the amount of material 38 trimmed is equal to the distance between the blade 90 and the feed means 42. This distance, and consequently the amount of material trimmed, may be adjusted by moving the blade holder 10 up or down using mounting means 15. Additionally, as explained in more detail below, the amount of material trimmed may be adjusted by adjusting the depth of the blade 90 in holder 10.

As also shown in the automatic skinning machine example of FIG. 9 and as is well understood in the art, the upper conveyor 50 has the ability to be pivoted in an upward direction, as well as in a rearward, or sideways direction, by means of four spring cylinders 70a–d. This allows the conveyor apparatus 40 to pivot about four independent points to accommodate irregularly shaped meat products thereby maintaining continuous, even pressure thereon.

Once meat product has been discharged from the rear of the apparatus by discharge means 46, the apparatus is ready to accommodate another meat product. It is common to use a conveyor for discharge means 46 similar to feed conveyor 44. The feed conveyor 44 transports another meat piece to be trimmed into position, where the product is engaged by feed roller 34 which in cooperation with conveyor 44, brings the meat product into trimming engagement with trimming blade 90 and the entire trimming cycle is started again.

It is clear from viewing FIG. 9 that access to the blade holder 10 is greatly limited. Prior art blade holders utilizing a handlebar to effect a changing of the blade would appear to conflict with the upper portion of carriage 35, and the discharge of meat products when it is raised for the blade change.

When used with an automatic trimming machine such as the Maja GEA, SBA, ESB model machines or the like, the engagement handle bar associated with these prior art changers may interfere with the discharge of meat therefrom. As explained in U.S. Pat. No. 5,236,323 hereby incorporated by reference, discharge of the meat is accomplished by pushing the trimmed meat product rearwardly over the top of blade holder 10 where it drops onto discharge conveyor 46. Thus a handle bar positioned rearwardly of the blade holder, such as in the prior art, will obstruct the path of the meat product as it moves past the blade holder and onto the discharge conveyor. Thus it is clear that such prior art blade holders are unsuitable for use in automatic trimming machines.

It will further be observed from the illustration in FIG. 9 that access to the blade holder 10 is primarily limited to the sides. For this reason, the release handles 18a and 18b of the present invention are positioned on the outward portions of the holder 10 so that access may be easily gained from the side. Additionally, as will be clearer in later figures, once the blade has been loosened, it may be removed and replaced from the side.

It should be noted in discussing the figures that the proportions shown are not critical. Rather, features such as the ramp height, cam size and the like can be varied to accommodate a given configuration.

Figure 2:
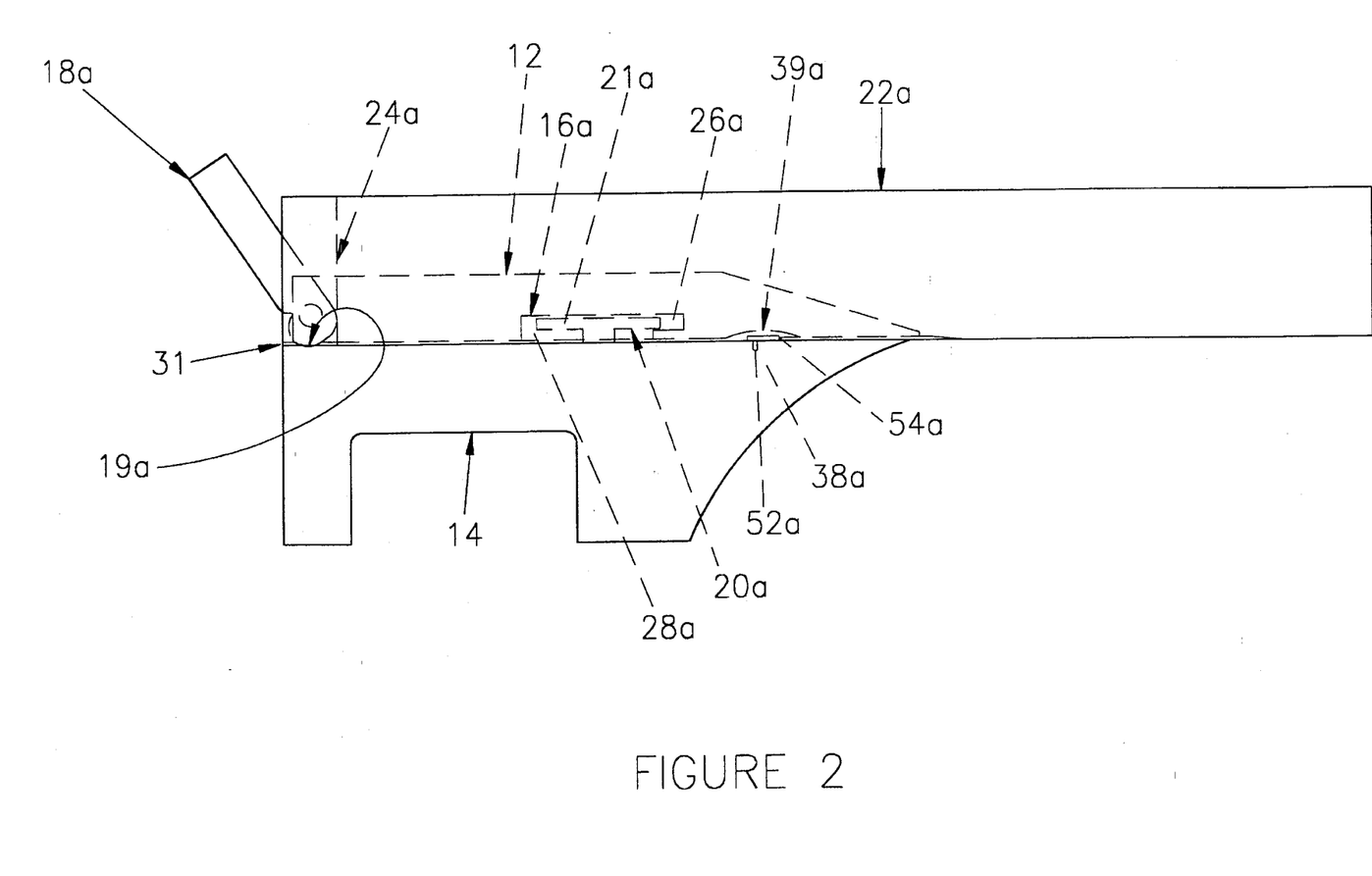
FIG. 2 is a side view of the quick change blade holder of the present invention showing the clamping means in the generally upright release position.

FIG. 2 is a side view illustrating the quick change blade holder apparatus of the present invention in the release configuration. As seen in this figure, the clamping plate 12 is positioned adjacent the top surface of base plate 14 with little or no space therebetween. A series of mounting pins 20a–d (FIG. 6) provide a means for removably securing the upper clamping plate to lower base plate 14. One of the four mounting pins 20a is illustrated in the side view of FIG. 2. As seen in the figure, the mounting pin 20a secured to base plate 14 is received within the mounting pin receiving void 16a. Although not visible in this figure, a similar series of voids 16b–d exists for pins 20 b–d. These series of pins 20a–d and associated voids 16a–d comprise the fulcrum means discussed below.

It will be observed from the figure that mounting pin receiving void 16a comprises an opening 28a in the lower portion thereof of a size and shape which permits head 21a of pin 20a to be projected therethrough. The void 16a further includes a forward portion 26a which permits the forward portion 52a of head 21a to be slidably received and frictionally engaged therein. It can also be seen in the figure, that the clamping plate 12 has been moved slightly rearwardly relative to base plate 14. As illustrated, the forward portion 52a of head 21a on pin 20a has just begun to be received within the forward portion 26a of receiving void 16a. As mentioned above, once the forward portion of head 21a has been received and frictionally engaged in void 16a, plate 12 and plate 14 are releasably secured. This frictional engagement between pins 20a–d and the clamping plate 12 forms a fulcrum point permitting the blade to be clamped into position between the base and clamping plates.

As mentioned, in the preferred embodiment, the fulcrum means comprises a series of mounting pins 20a–d secured to bottom, base plate 14 which are adapted to be received in and engaged by a series of voids 16a–d. By well understood principles, when the fulcrum means is activated by separating the rear portions of the base and clamping plates, a corresponding clamping action between the forward portions of the two plates results. Thus, an object such as a blade placed between the forward portions of the two plates may be clamped in position by activating the fulcrum means.

As mentioned, the fulcrum means is activated by a means (FIGS. 5 and 6) for releasably separating the rearward portions of the two plates. In the preferred embodiment, the means 31 for releasably separating the rearward portions of the two plates is an inclined ramp 32 positioned at the rearward edge of the bottom, base plate 14, and an associated pair of cam handles 18a and 18b The cam handles 18a and 18b are used to urge the top, clamping plate 12 rearwardly such that the rearward edge 30 of the clamping plate 12 engages and is moved up the ramp 32 as the clamping plate 12 moves further rearward in response to further activation of the cam handles 18a and 18b. As will be clear from an observation of the figures, as the rearward edge 30 of the clamping plate 12 moves up the ramp 32, the separation of the two plates 12 and 14 becomes greater. Conversely, to release the separation of the two plates, the clamping plate 12 need only be moved forwardly allowing the rearward edge 30 thereof to move down the ramp 32.

The preferred means for releasably separating the plates and activating the fulcrum means are the cam handles 18a and 18b. Seen in this view is first cam handle 18a positioned in the generally upright, or release position. A pair of cam arms 18a and 18b are provided to adjust the relative horizontal positioning of the base 14 and clamping plate 12 as explained below. More specifically, they move the clamping plate 12 rearward, urging it up ramp thereby separating the rear portions of plates 12 and 14. Cam arms 18a and 18b are pivotally connected to the rearward portion of clamping plate 12. As seen in this figure, when the cam handle is positioned in the generally upright or release position as shown, it is not in contact with vertical wall 24a formed in the rearward portion of end plate 22a (see FIG. 7). As shown and described in a later figure, when cam handles 18a and b are pivoted to the generally lowered or locking position, the forward portion 19a and b (FIGS. 1 and 8) of cam handles 18a and 18b, respectively, engage the vertical members 24a and 24b applying further rearward pressure on vertical members 24a and 24b . Since cam arms 18a and 18b are fixed to clamping plate 12, and since vertical members 24a and 24b are attached to base plate 14, this movement of the cam handles causes clamping plate 12 to move rearwardly relative to base plate 14, causing the rearward edge 30 (FIGS. 8 and 10) of clamping plate 12 to engage ramp 32. As shown more clearly in later figures, the movement of the rearward edge 30 of plate 12 up ramp 32 causes a vertical separation between the rearward portions of the plates. This separation between the plates, in conjunction with the fulcrum means provided by pins 20a–d and associated voids 16a–d , results in a pivoting of the forward portion of clamping plate 12 downwardly, serving to clamp blade 90 in position. The interaction between the plates and the ramp are more clearly illustrated in FIGS. 8 and 10.

The blade holder of the present invention also comprises a plurality of blade positioning means 3a–c for adjusting the depth positioning of blade 90 in the holder. Adjusting the depth the blade 90 is received within the holder 10, allows the amount of material trimmed to be adjusted. One of the blade positioning means 38a is shown in FIG. 2. In the preferred embodiment, blade positioning means 38a–c comprises a plurality of cams 54a–c projecting upwardly above the surface of base plate 14. Cams 54a–c provide a stop against which the rearward portion of the blade 90 rests (see FIG. 6 & 11) when inserted in the holder. A plurality of recesses 39a–c (FIGS. 2–5), positioned to correspond with cams 54a–c, are provided in the surface of clamping plate 12 to receive that portion of cam 54a–c respectively projecting through the surface of base plate 14. As described in more detail in conjunction with FIG. 11 below, positioning means 38a–c are constructed using a cam arrangement allowing the position of the cam 54a–c, and consequently the depth the blade 90 is received in the holder, to be adjusted. As will be clear from FIG. 9, the greater the depth of blade 90 in holder 10, the less the blade is exposed and the greater distance between blade 90 and feed means 42 and consequently, the greater the amount of material trimmed from the meat product.

Figure 1:
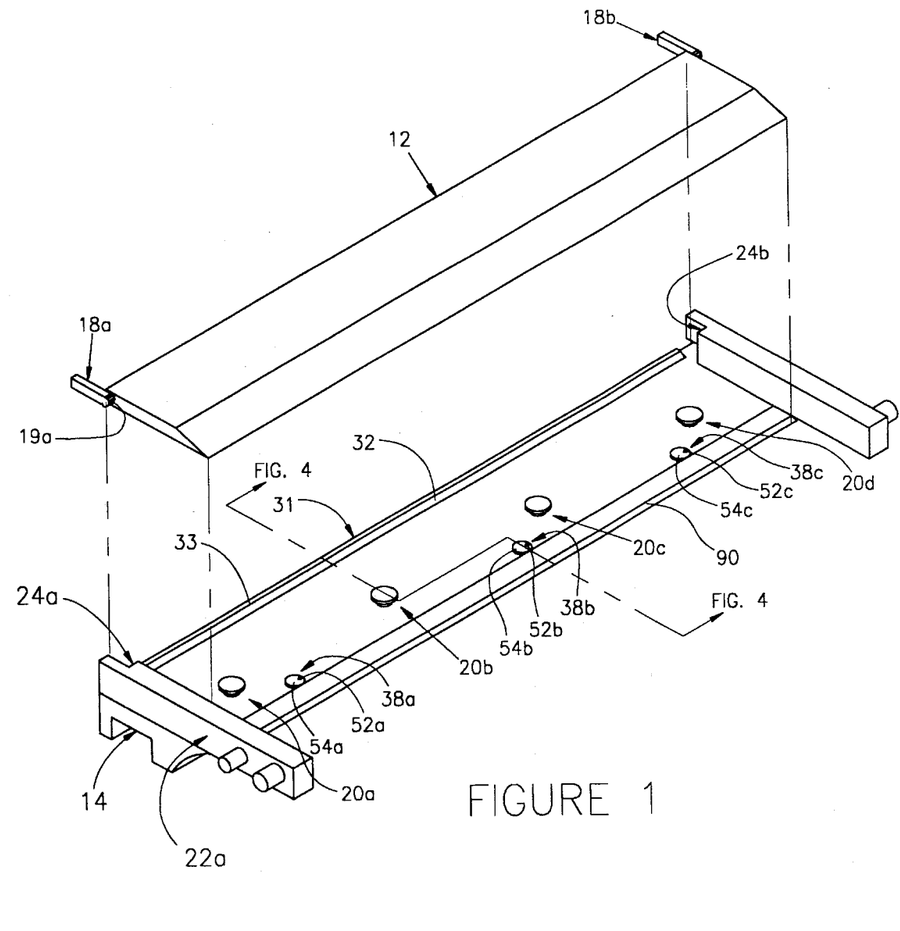
FIG. 1 is exploded perspective view showing how the base and clamping plates fit together.
Figure 3:
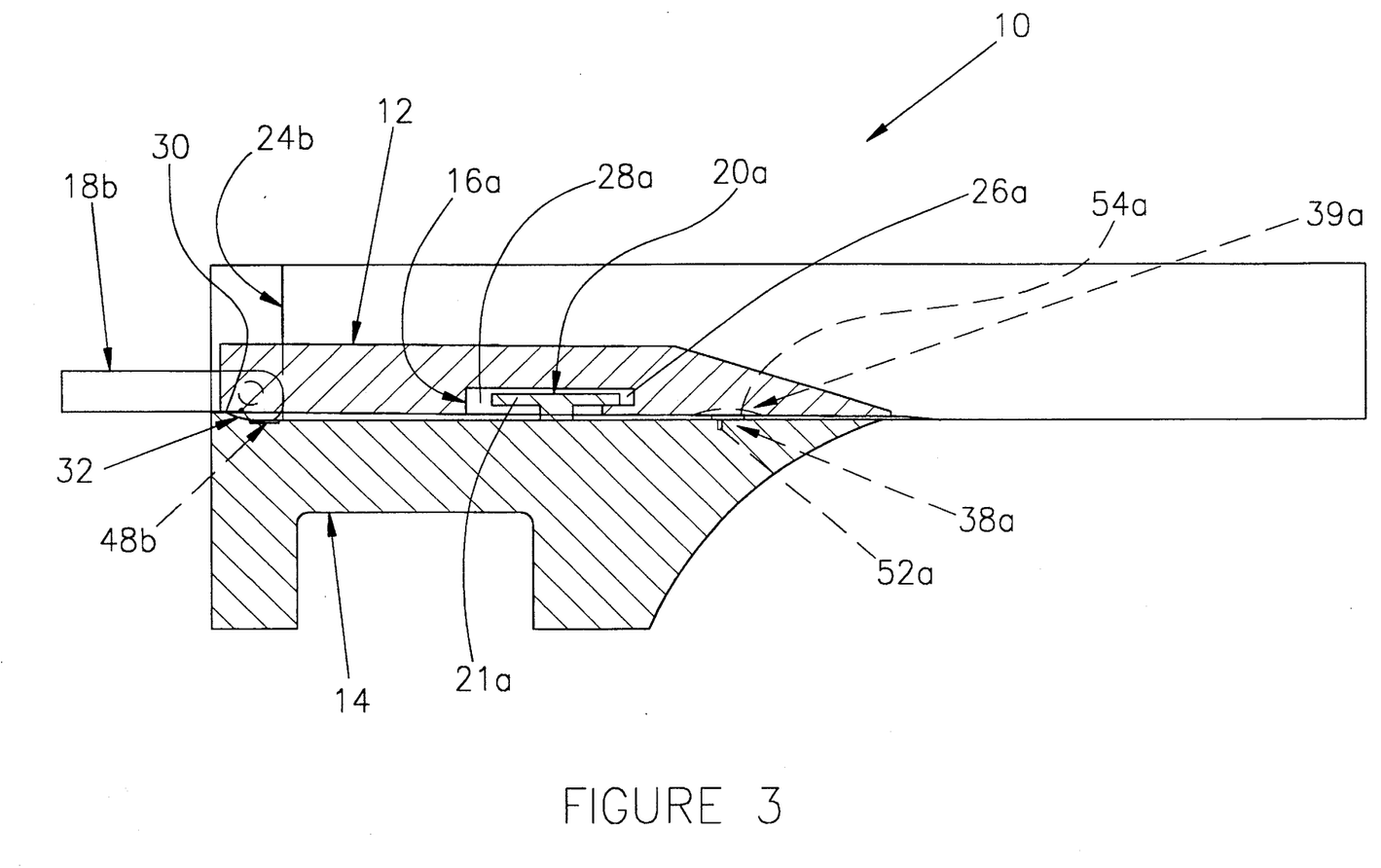
FIG. 3 is a side view of the quick change blade holder of the present invention showing the clamping means in the generally lowered locking position.

FIG. 3 is a side sectional view showing the positioning of various components of the apparatus when the cam handles 18a and b are positioned in the generally lowered, locking position with the forward portions of the base 14 and clamping 12 plates firmly clamped. As seen in this figure, the clamping plate 12 is positioned slightly rearwardly of that shown in FIG. 2. As mentioned above, this further rearward positioning is caused by the engagement of the forward portions 19a and 19b cam handles 18a and 18b with the vertical walls 24a and 24b formed in the rearward portion of end plates 22a and 22b respectively. End plates 22a and 22b are in turn connected to opposite ends of base plate 14 as seen in FIG. 1.

Also shown in this figure, is the engagement of the rearward edge 30 of clamping plate 12 with the raised flat surface 33 in the rearward portion of base plate 14. As is explained above and clearly shown in the figure, the engagement of the rearward edge 30 of clamping plate 12 with this raised flat surface 33 defines a separation between the rearward portions of clamping plate 12 and base plate 14. As seen clearly in this view, the further the rearward edge 30 of clamping plate 12 moves up sloping surface 32, the greater the vertical separation between the rearward portions of plates 12 and 14 until reaching a maximum separation defined by the elevation of flat surface 33. Since the interconnection between mounting pins 20a–d and corresponding receiving voids 16a–d provide a fulcrum point, it is clear that any increase in separation, between the rearward portions of plates 12 and 14 will cause a corresponding increase in clamping force between the forward portions thereof. Thus, an increasing amount of pressure will be applied on the blade 90 positioned therebetween.

Figure 10:
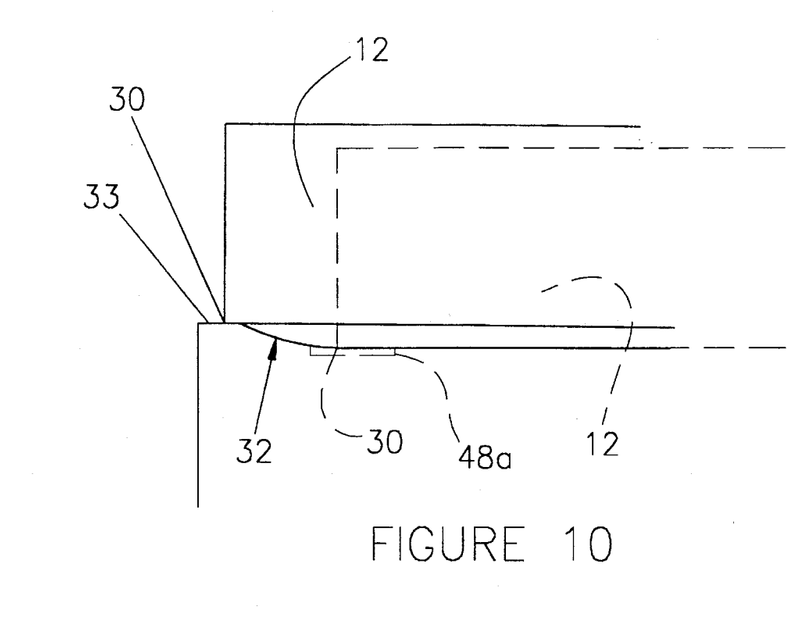
FIG. 10 is a side view of the rear of the apparatus showing how the rear of the clamping and base plates are releasably separated using the ramp.

This interaction between the ramp 32 and plates 12 and 14 is especially well illustrated in FIG. 10. In that highly enlarged figure showing the rear portions of the plates, the maximum separation between the plates is illustrated with the clamping plate 12 in solid lines. This would correspond with the locking or clamping position. As seen in this figure, the rear portion 30 of the clamping plate 12 is positioned atop surface 33. Conversely, the release position is indicated by clamping plate 12 in dotted lines. As illustrated, the rear portion 31 of the clamping plate 12 is positioned forwardly of ramp 32 causing plate 12 to rest adjacent the top surface of base plate 14.

It will also be observed from FIG. 3 that a small recess 48b is positioned, below the respective cam lever 18b, in base plate 14. A similar recess 48a exists for cam lever 38a. The purpose of recesses 48a and 48b is twofold. First, they provide a place in which the forward portion 19a and b of the cam levers 18a and b may be received when the levers are placed in the generally upright, release position. An important feature of the invention results from the second purpose for recesses 48a and 48b. Namely, they provide a means for urging the clamping plate 12 forwardly, facilitating the disengagement of clamping plate 12 from pins 20a–d It will be observed from careful study of the figure that if the cam lever is pivoted upwardly from the position shown in FIG. 3, the forward portion 19b of cam lever 18b will begin to contact the rearward face of recess 48b. This in turn will urge the cam forwardly relative to base plate 14. A similar action would exist with cam lever 18a and recess 48a. Since the cam levers are pivotally secured to clamping plate 12, this will urge clamping plate 12 forward, relative to mounting pins 20a–d in base plate 14 disengaging it therefrom.

Figure 4:
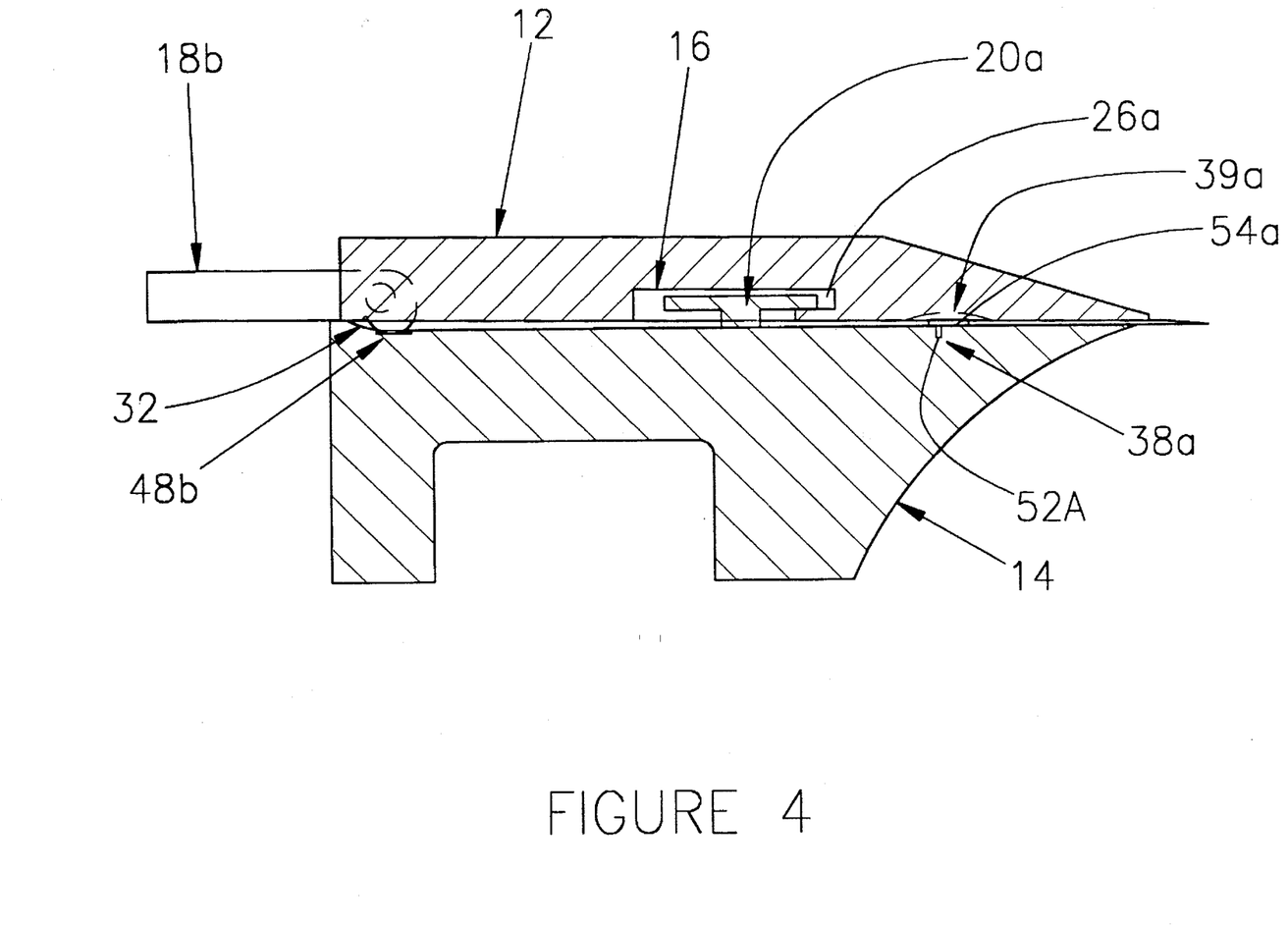
FIG. 4 is a side view of the quick change blade holder of the present invention showing the clamping means in the generally lowered locking position and the blade secured into place.
Figure 5:
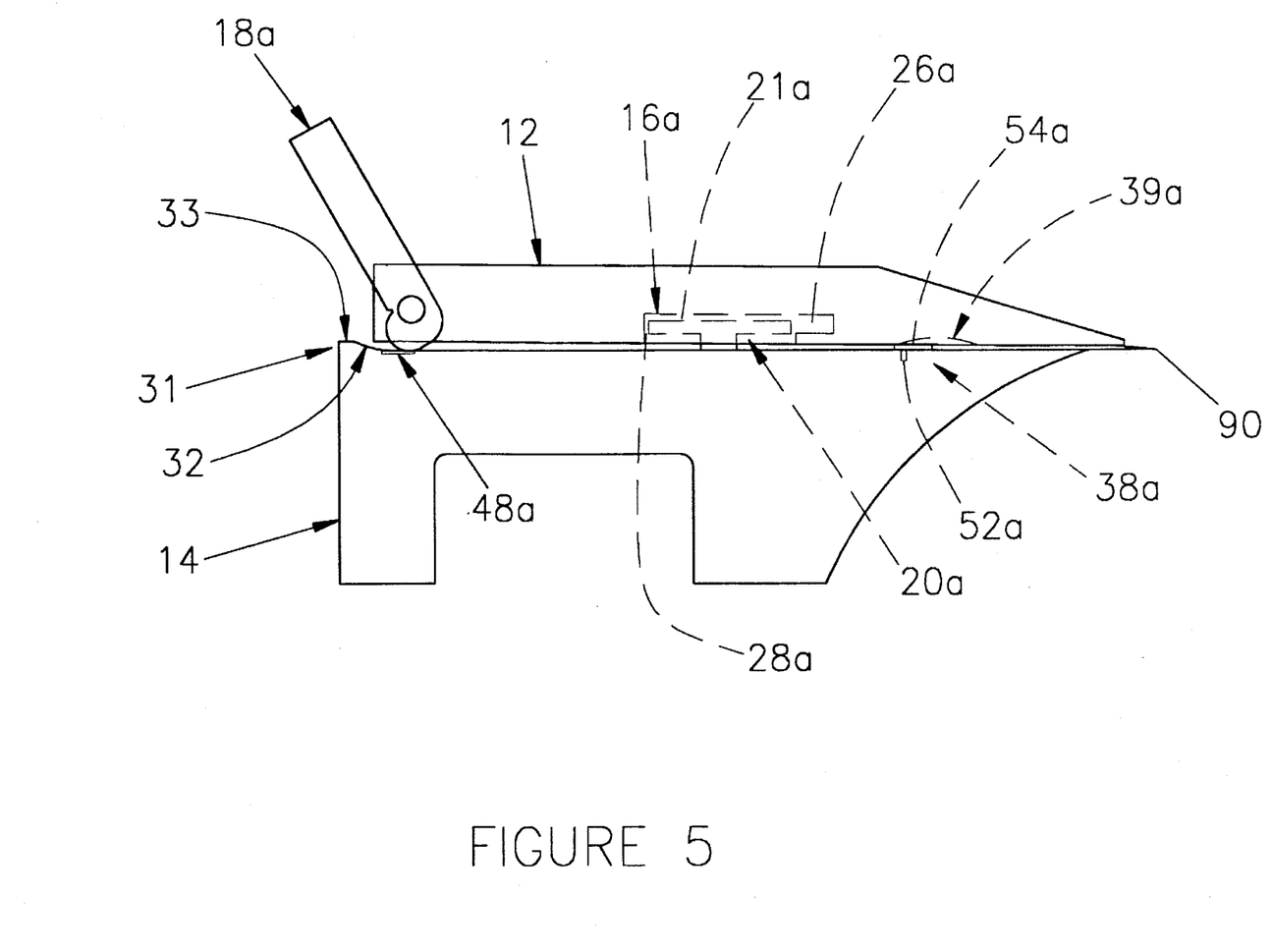
FIG. 5 is a side view of the quick change blade holder of the present invention showing the clamping means in the generally upright release position with the blade available for replacement.

FIGS. 4 and 5 present views similar to FIGS 2 and 3, respectively, but with the blade installed. The positioning of the blade 90 between the clamping and base plates 12 and 14 in the locking and release configurations is clearly shown in FIGS. 4 and 5 respectively. As seen in FIG. 5, when the cam handles 18a and b are positioned in the generally upright, release position, the spacing between the clamping and base plates 12 and 14 is nearly uniform from front to back. When the cam handles 18a and b are moved into the generally lowered, locking position as seen in FIG. 4, it is seen that the vertical distance separating plates 12 and 14, has increased. This produces the fulcrum action described, clamping blade 90 in place. It is also seen in these figures the operation at the blade retention means in positioning blade 90 wherein the rearward portion of blade 90 contacts cams 54a–c preventing additional rearward movement.

Figure 6:
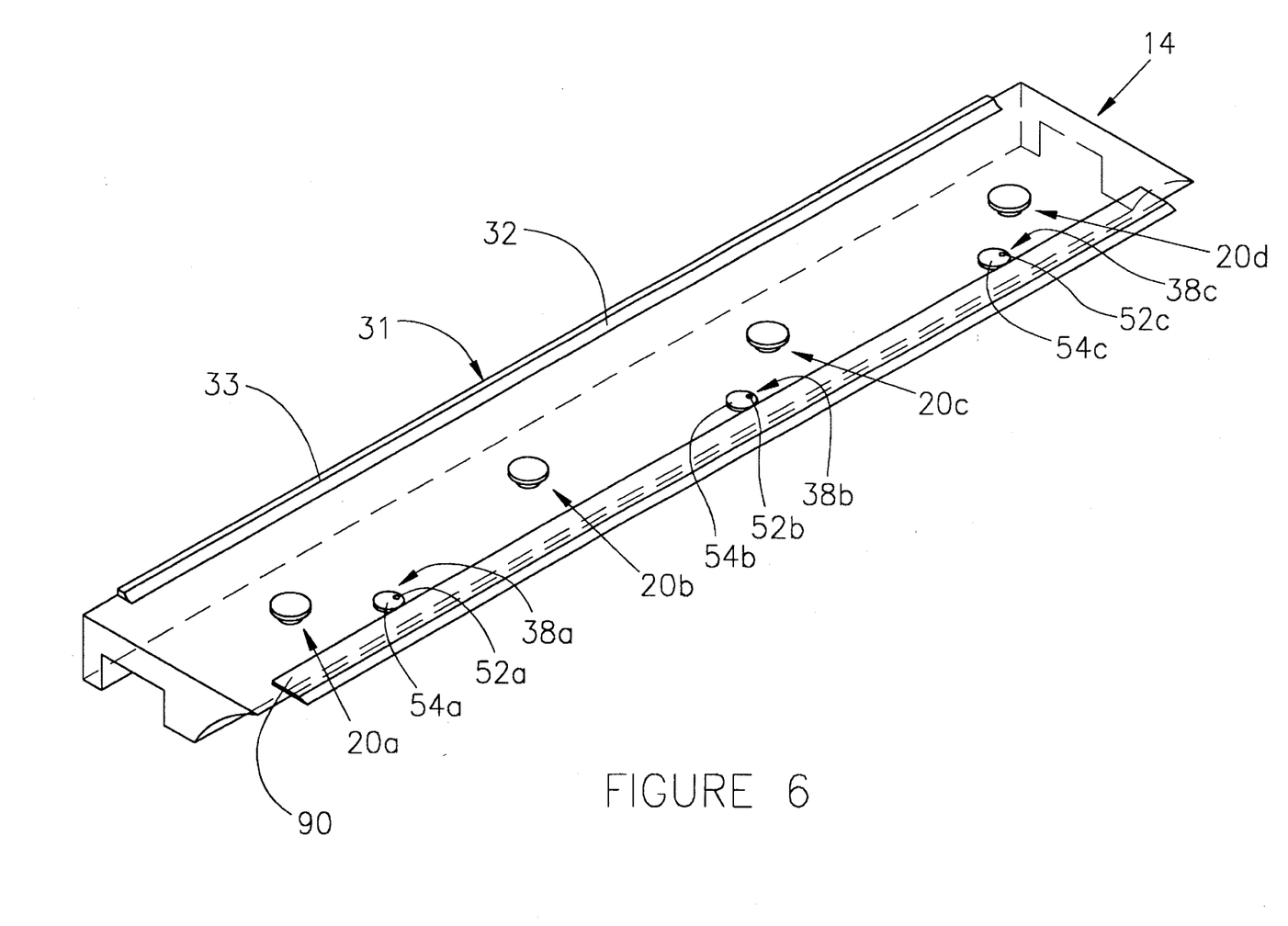
FIG. 6 is a perspective view showing the components of the quick change blade holder in exploded view.

FIG. 6 has an perspective view of the blade holder apparatus of the present invention showing the interconnection of various components thereof. Seen clearly in this figure, are the four mounting pins 20a–d which are adapted to be received in the voids 26a–d in upper clamping plate 12 as described above. Also seen in this figure, is how the blade 90 is positioned on the forward portion of base plate 14 using positioning means 38a through c. To properly position blade 90, all that need be done is to place the blade on plate 14 and adjust its position such that the rearward portion thereof rests against cams 54a–c.

Figure 11:
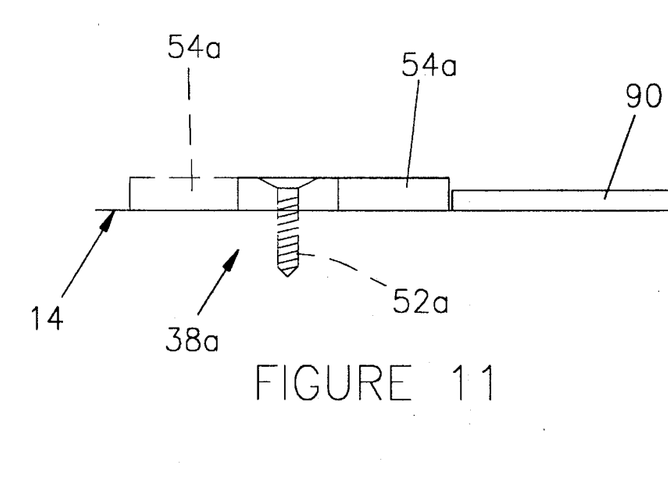
FIG. 11 is a side view of the blade positioning means and its movement between different positions.

As described above, blade positioning means 38a–c operate on a camming principle which allows the resting position of the blade 90 to be adjusted. This variable positioning feature is well illustrated in FIG. 11. It will be observed from FIG. 6 that each positioning means 38a–c comprises a cam 54a–c having an associated cam post 52a–c which is mounted off-center from its respective cam. The cam post can be a set screw which can be loosened to permit adjustment of the cam. By principles well understood in the art, the off-center mounting of the cam to its cam post allows the forward/rearward position of the cam to be altered by loosening the set screw 52a, rotating the cam 54a and retightening screw 52a. Two extreme positioning examples are illustrated in FIG. 11 with the forward most position of cam 54a represented by the solid line and the rearwardmost position represented with the dotted line. Also shown in FIG. 11 is how the blade 90 abuts with the cam. The remaining cams 54b and 54c operate in the same fashion. Since the position of the blade 90 is controlled using the cams, against which the rearward edge of the blade 90 rests, the positioning of the blade 90 may be adjusted.

Figure 7:
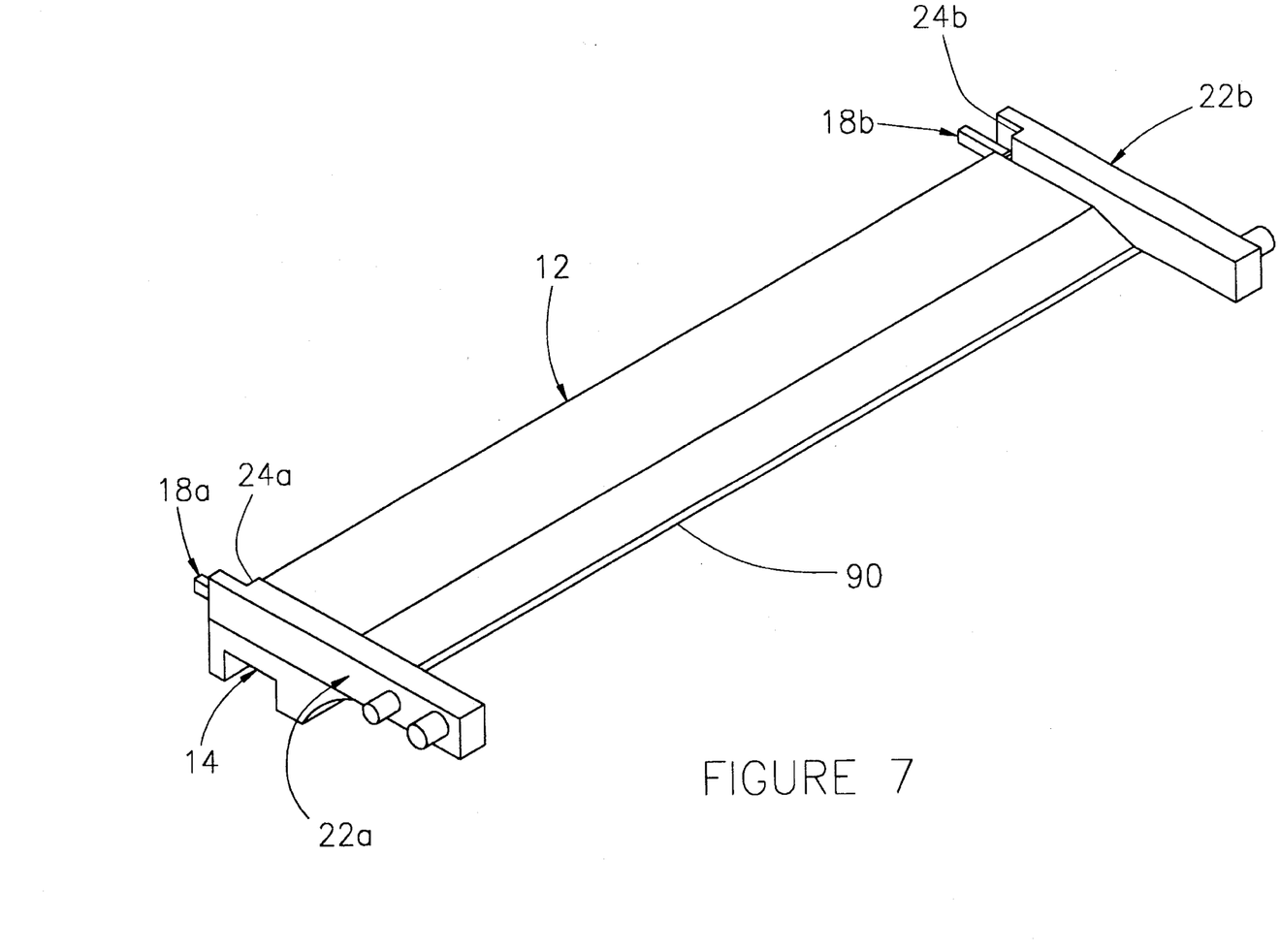
FIG. 7 is a perspective view of the quick change blade holder showing the holder in assembled form.

FIG. 7 is a perspective view illustrating an assembled blade holder apparatus. Shown clearly in this view are the vertical walls 24a and b formed in the rearward portion of end plates 22a and b respectively which are secured to base plate 14. As mentioned above, it is these vertical walls against which the leverage action provided by cam handles 18a and b operate to urge clamping plate 12 rearward relative to base plate 14.

Figure 8:
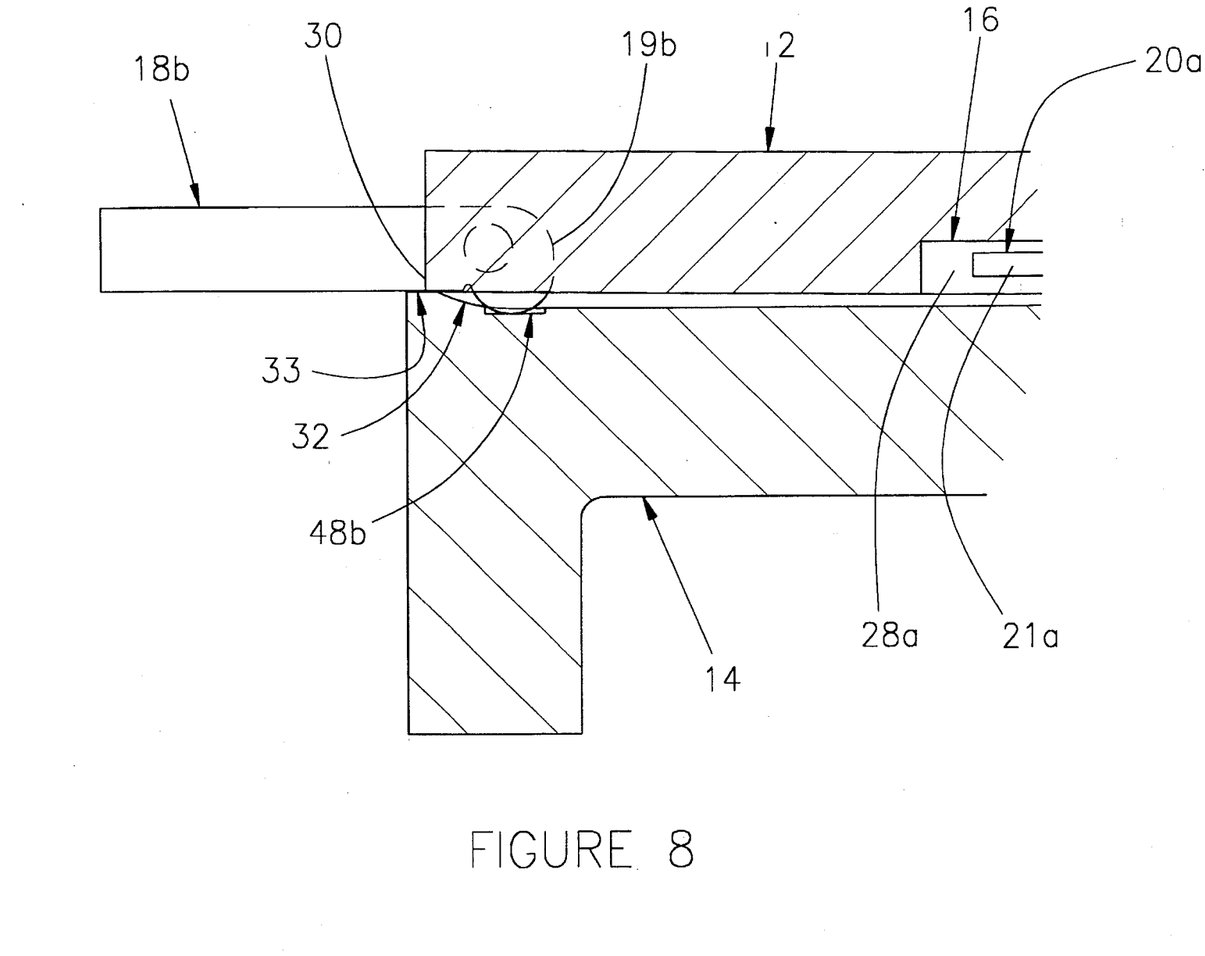
FIG. 8 is an enlarged sectional view showing the rearward portion of the apparatus and its operation in conjunction with the inclined ramp.

FIG. 8 is a greatly enlarged sectional side view of the rearward portion of the apparatus. This figure illustrates clearly the important relationship between the rearward edge and ramp 32 and flat surface 33 in the rearward portion of plate 14. Specifically, as seen in the figure and as described above, the leverage provided by cam handles 18a and b serves to move plate 12 rearwardly. Clearly, this rearward movement of plate 12 will cause rearward edge 30 to contact ramp 32 and urge it upwardly until reaching flat surface 33 as shown. As seen in the figure, the elevation of flat surface 33 above the remainder of plate 14 defines a vertical separation between the rearward portions of plates 12 and 14. The relative positioning of the plates 12 and 14, cam handles 18a and 18b, sloping surface 32, and flat surface 33 are designed so that when the cam handles 18a and 18b are moved to the lowered locking position as illustrated, the rearward edge 30 of plate 12 will rest atop the flat surface 33, as shown in the figure, providing the maximum amount of clamping action against blade 90.

Figure 12:
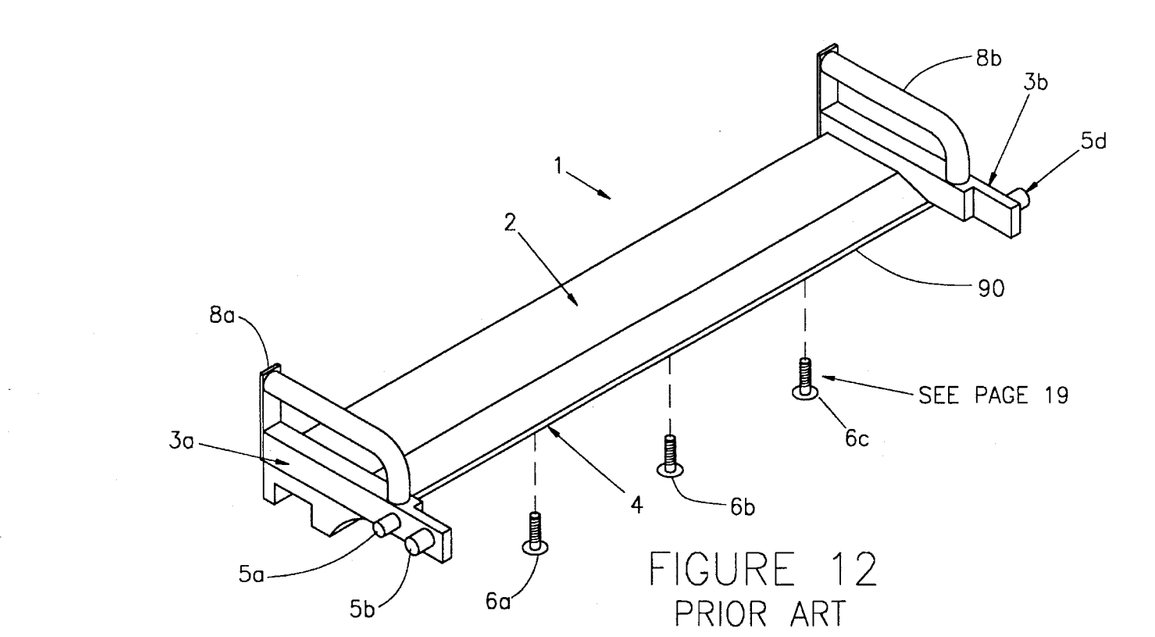
FIG. 12, .13 and 14 are perspective, side and front views, respectively, of the prior art blade holders.
Figure 13:
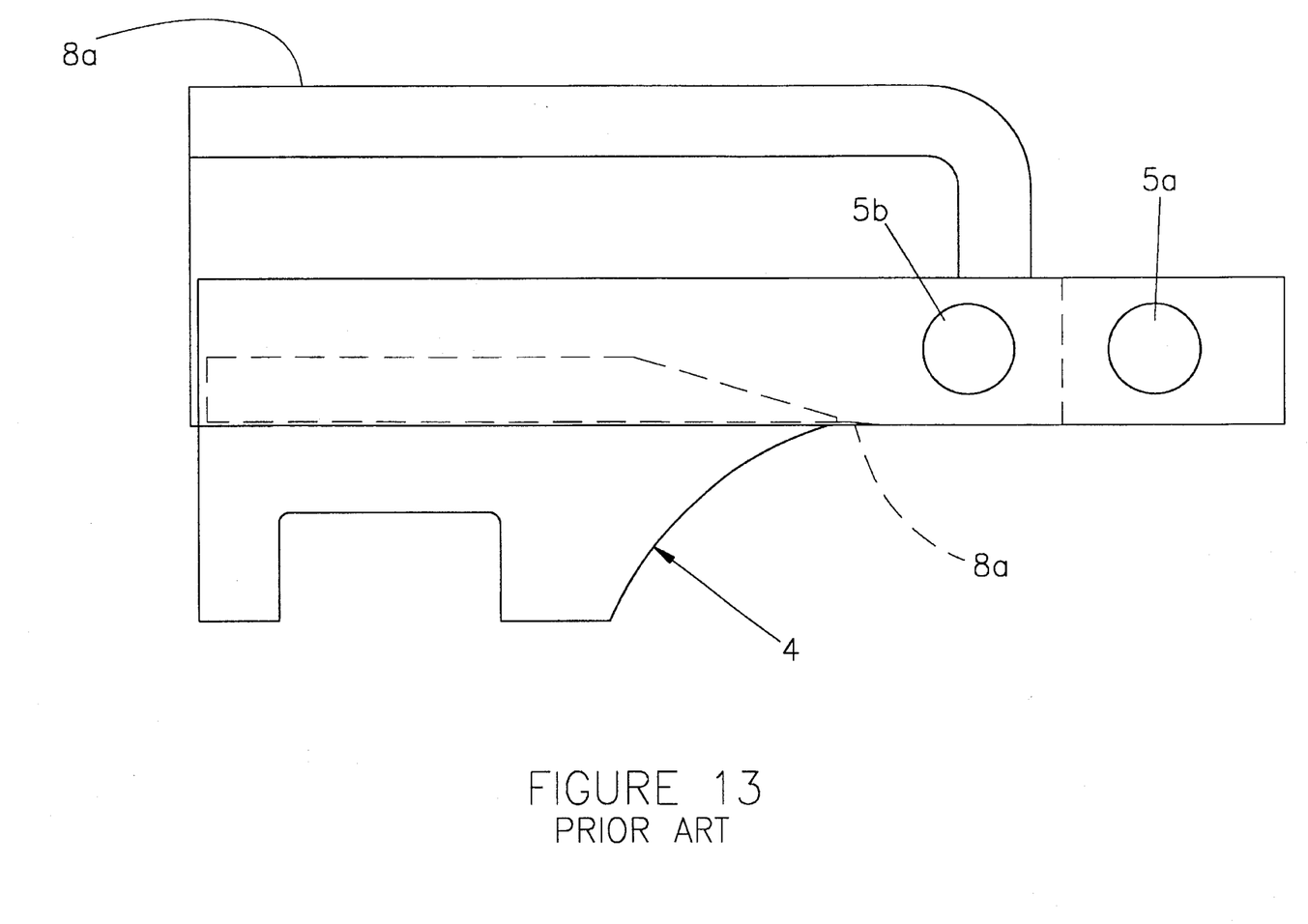
Figure 14:
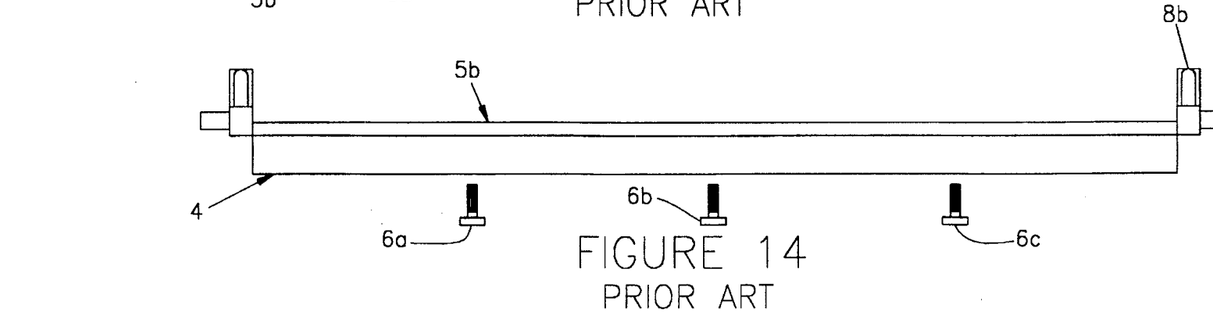

FIGS 12, 13 and 14 are perspective, side and front views respectively, of a prior art blade holder 1. As can be readily seen in the figures, the blade holder 1 of the prior art configuration is substantially straight. Clamping and base mounting plates 2 and 4 respectively are substantially straight pieces wherein blade 90 is held therebetween. As shown in the figures, flexible blade 90 is "sandwiched" between clamping mounting plate 2 and base mounting plate 4. The two plates 2 and 4 are then held together using a plurality of locking screws 6a–c.

Blade holder 1 comprises installation handles 8a and b for installing and removing blade holder 10 from a trimming apparatus. As mentioned above, the design of prior art holders required that they be completely removed to accomplish a blade change. Handles 8a and b are secured to mounting end plates 3a and b which are in turn secured to the ends of clamping and base mounting plates 2 and 4. Also shown in the figures are the mounting pins 5a–d which are used for guiding and locking the blade holder apparatus 10 into proper position. Finally, guide plate 16 is used for guiding blade holder apparatus 10 during installation into the automatic trimming apparatus of FIG. 1. Changing of the blade would then be accomplished by removing the holder, loosening screws 6a–c, separating plates 2 and 4, replacing the blade, retightening the plates and reinstalling the holder.

It is obvious that numerous other modifications and variations of the present invention are possible in view of the above teachings. For example, as mentioned, the proportions shown in the figures are not critical. Features such as the ramp height may be varied to accommodate a particular size of base or clamping plate or a particular blade thickness. Additionally, a modification would be to incorporate an adjustment means for adjusting the height of the blade from the feed roller in order to further accommodate different meat types and trim amounts. Such an adjustment means might be manual or automatic, for example where an X-ray apparatus senses the fat depth and adjusts the blade accordingly. Additionally, it might be desirable to incorporate some alternative mechanism to accomplish the rearward movement of the top clamping plate such as some sort of lever means or some more complicated motor arrangement.

Therefore it is to be understood that the above description is intended in no way to limit the scope of protection of the claims and is representative only of the several possible embodiments of the present invention.

There has thus been shown and described an invention which accomplishes at least all of the stated objects.

We claim:

1. A toolless quick change blade holder for receiving and supporting a blade in a skinning machine for trimming a layer of unwanted material from a meat product, the blade holder comprising:

a lower base plate;

an upper clamping plate adapted to be removably secured to said lower base plate, said lower base and upper clamping plates having forward, central, and rearward portions, said blade being positioned between said forward portions of said lower base and upper clamping plates;

mounting means for mounting said holder on said skinning machine wherein said blade is positioned for trimming engagement with said meat product;

fulcrum means for removably securing said upper clamping plate to said lower base plate and for limiting upward movement of said central portion of said clamping plate relative to said base plate wherein said blade may be removably secured between said forward portions of said plates; and means for releasably separating said rearward portions of said base and clamping plates thereby pivoting said upper clamping plate relative to said fulcrum means to urge said forward portions of said plates together to clamp said blade therebetween said means including an upwardly and rearwardly sloping ramp, positioned along said rearward portion of said base plate such that rearward movement of said clamping plate causes said rearward portion of said clamping plate to engage and slide up said ramp causing said rearward portion of said clamping plate to be raised relative to said rearward portion of said base plate, activating said fulcrum means, and clamping said blade between said forward portions of said base and clamping plates.

2. The invention of claim 1 wherein said lower base plate comprises a pair of generally vertically disposed walls at the ends thereof and wherein said means for releasably separating said plates further comprises a pair of cam arms pivotally secured to said upper clamping plate and positioned adjacent and behind said vertically disposed walls, said cam arms being movable between a generally upright release position and a generally lowered locking position wherein movement of said cam arms from said upright position to said lowered position is operative to cause said cam arms to engage said wall and urge said upper clamping plate rearwardly causing said rearward portion of said upper clamping plate to move up said sloping ramp forcing said rearward portions of said plates apart and said forward portions together engaging said blade therebetween.

3. The invention of claim 2 further comprising disengagement means operative to disengage said fulcrum means thereby releasing said blade.

4. The invention of claim 3, wherein said disengagement means comprises a pair of recesses in said base plate positioned to receive a portion of said cam arms when said cam arms are moved from said locking position to said release position.

5. The invention of claim 1 further comprising a plurality of blade positioning means operative to position said blade in said holder.

6. The invention of claim 5 wherein said blade positioning means comprises a plurality of moveable cams operative to control the depth of said blade in said holder.

* * * * *